United States Patent
Li

(10) Patent No.: US 6,192,488 B1
(45) Date of Patent: Feb. 20, 2001

(54) RESTORING METHOD FOR HARD DISK

(76) Inventor: Chung-Ping Li, 12F-1, No. 337, Sec. 4, Hsin I Rd., Taipei (TW)

(*) Notice: Under 35 U.S.C. 154(b), the term of this patent shall be extended for 0 days.

(21) Appl. No.: 09/145,248

(22) Filed: Sep. 2, 1998

(30) Foreign Application Priority Data

Jul. 13, 1998 (TW) .................................................. 8711344

(51) Int. Cl.⁷ .................................................. G06F 11/00
(52) U.S. Cl. .............................................. 714/15; 713/200
(58) Field of Search .................................. 714/15, 16, 20, 714/21, 25, 27, 41, 42, 43, 44, 54; 713/200, 201, 202

(56) References Cited

U.S. PATENT DOCUMENTS

| | | | | |
|---|---|---|---|---|
| 4,916,605 | * | 4/1990 | Beardsley et al. .................. | 364/200 |
| 5,086,502 | * | 2/1992 | Malcolm ........................... | 395/575 |
| 5,446,877 | * | 8/1995 | Liu et al. .......................... | 395/180 |
| 5,717,919 | * | 2/1998 | Kodavalla et al. ................. | 395/608 |
| 5,956,745 | * | 9/1999 | Bradford et al. .................. | 711/137 |
| 6,108,748 | * | 8/2000 | Ofek et al. ........................ | 711/112 |

OTHER PUBLICATIONS

Kawamoto, M, Restoring and updating records in disk cache system during disk drive idle time–restores record to disk drive from non–volatile memoryin response to receipt of start and end addresses of record from non–volatile memory, Derwent Week: 199714, Dec. 1996.*

Kaise, Hiroshi, Data writing error preventing system to magnetic tape media, JPAB, JP363046660A, pp. 1 of 1, Feb. 1988.*

* cited by examiner

Primary Examiner—Nadeem Iqbal
(74) Attorney, Agent, or Firm—Rosenberg, Klein & Lee

(57) ABSTRACT

Disclosed is a restoring method for hard disk comprising following steps: scanning the partition and file allocation table (FAT) of hard disk and recording above information in a plurality of flag regions on end portion of hard disk wherein each flag region contains flag for indicating the accessibility of sector in hard disk and pointer association to other flag; and replacing the INT 13 of BIOS with a modified MYINT 13 to handle the reading and writing operation of data; wherein the modified MYINT 13 can find a writable location by referring to the flag region and the privilege of user and invoke the original INT 13 to execute the real reading and writing operation. By above steps, the writing operation to a location containing data can be prevented, and the data accessed by other user in a multi-user mode can also be prevented. The data in hard disk can be restored by initializing the disk with the flag region located at end portion of the hard disk in case that the system is down or the partition of FAT of hard disk has been infringed.

3 Claims, 2 Drawing Sheets

RESTORING METHOD FOR HARD DISK

The present invention relates to a restoring method for hard disk, more particularly, to a real-time restoring method for hard disk.

The usage of computer is popular in modem life either for business or for household application However, the software becomes bulky and complicated such that the system is easy to breakdown for careless usage. Moreover, the risk of breakdown of hard disk is still high because there is still no perfect method for defense the attack of virus.

To minimize the cost of data lost, an approach is to use storage means to back-up the data, such as floppy disk, MO or CDROM. However, this approach becomes cumbersome as the size of data increases. Alternatively, hard disk protection means realized by hard ware solution has been proposed. However, the protection scheme is hard to update due to the hardware nature thereof.

It is an object of the present invention to provide a real-time restoring method for hard disk and execution of the inventive method will not occupy hard disk space, therefore the inventive method provide more convenient way to protect hard disk data for computer user, especially for novice user.

To accomplish the above object, the restoring method according to the present invention comprises following steps (1) Scanning the partition and file allocation table (FAT) of hard disk and recording above information in a plurality of flag regions on end portion of hard disk wherein each flag region contains flag for indicating the accessibility of sector in hard disk and pointer association to other flag;

(2) Replacing the INT 13 of BIOS with a modified MYINT 13 to handle the reading and writing operation of data; wherein the modified MYINT 13 can find a writable location by referring to the flag region and the privilege of user and invoke the original INT 13 to execute the real reading and writing operation. By above steps, the writing operation to a location containing data can be prevented, and the data accessed by other user in a multi-user mode can also be prevented. The data in hard disk can be restored by initializing the disk with the flag region located at end portion of the hard disk in case that the system is down or the partition of FAT of hard disk has been infringed.

The various objects and advantages of the present invention will be more readily understood from the following detailed description when read in conjunction with the appended drawing, in which:

DETAILED DESCRIPTION OF THE PREFERRED EMBODIMENT

Figure 1:
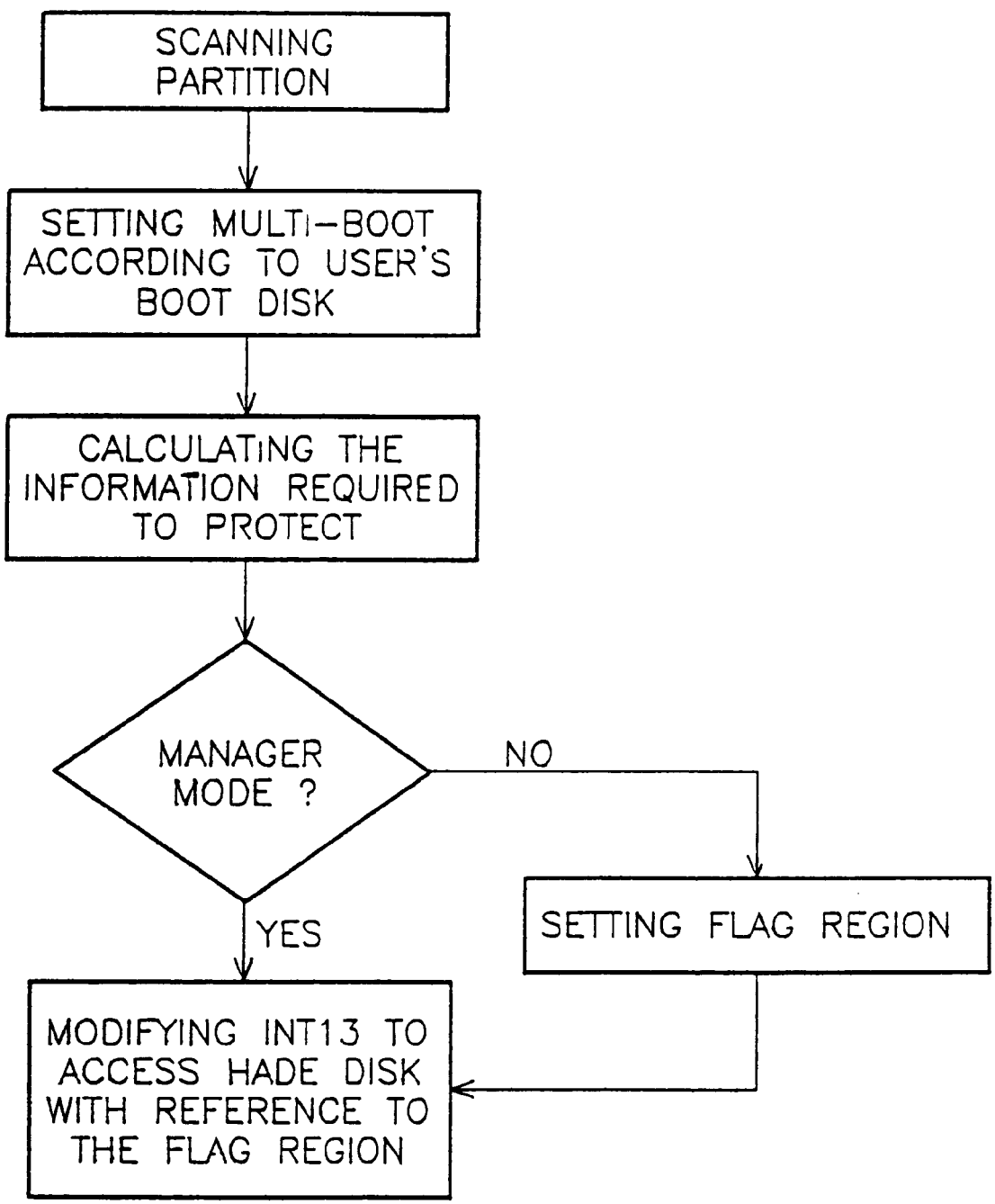
FIG. 1 Shows the flowchart of a preferred embodiment according to the invention method.

With reference to FIG. 1, the main flowchart of the inventive approach comprising following steps:
(1) Scanning the partition of hard disk and recording the information;
(2) Setting up multi-boot procedure according to the boot driver of user
(3) Calculating the amount of data required protection.
(4) Determining the mode of operation for manager mode, the hard disk can be accessed directly except for the boot sector for ordinary user mode, the ordinary-user procedure is invoked to protect the hard disk data.

Figure 2:
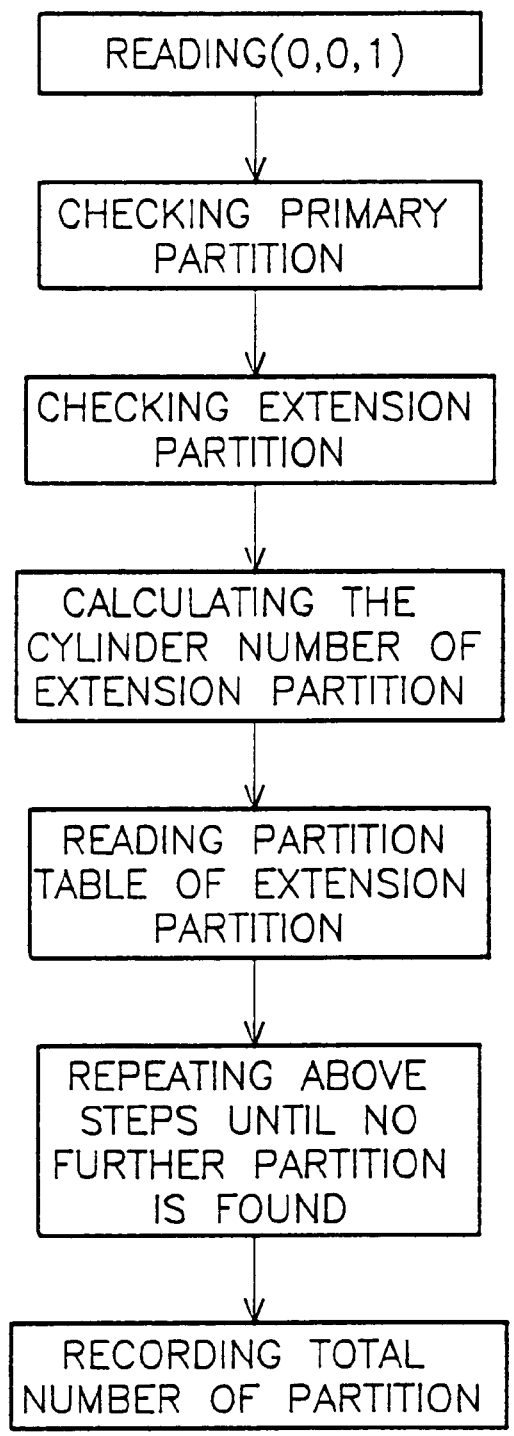
FIG. 2 Shows the steps of partition scanning process for the flowchart shown in FIG. 1

FIG. 2 shows the steps of scanning partition of hard disk:
1. Reading the location 0th cylinder, 0th header and fire sector of the boot sector (for sake of convenience, we will abbreviate the location mth cylinder nth header and pth sector as (m,n,p) in following description).
2. Checking the primary partition
3. Checking the extension partition
4. Calculating the cylinder number of extension partition
5. Reading extension partition;
6. Repeating above procedures until no new partition can be found;
7. Recording the total number of partition.

After finishing the recording of total number of partition, a partition flag 055AA55AAH can be set up as an indicator. When the system is restarted, the registered partition data can be used if the partition flag is not changed, or the above checking processed should be executed.

The flag region mentioned above locates at the end of the hard disk and the size thereof depends on the size of corresponding hard disk. The flag region is used to record the status of the hard disk after scanning. Each flag region contains 32 bit with higher 8 bit indicating the status of corresponding sector (1 indicating that the sector has been used; 0 indicating that the sector is free) and lower 24 bit as pointer pointing to other flag region.

The flag region contains following possibility.
1. used by manager.
2. used by other flag
3. used by the present flag
4. free to use
5. pointing to other flag The flag region can be employed to determined the right of accessing hard disk location according to the privilege of user The above-mentioned ordinary-user procedure containing following steps:
1 Calculating the location of accessing sector and the number thereof (Sector location is represented by logical number)
2 Calculating the real location of the first sector to be accessed;
3 Invoke the BIOS INT 13 to access the sector in the real location calculated by above steps.
4 Repeating above steps 2, 3 until all the sectors have been accessed.

For example, if the user is to access the first three sector (0,0,1), (0,0,2), (0,0,3) beginning from the location (0,0,1), then the real locations determined by above second step are (5,3,2), (7,8,9) and (10,11,12). The data in those locations can be accessed by invoking BIOS INT 13 in above-mentioned third step.

More particularly, on the assumption that the number of sector to be accessed is denoted as Current Sector, the calculation of real location of a specific sector can be performed through following steps
1. The real location is Current Sector+3+begin location of partition if Current Sector<5
2. The data in sector of Current Sector can only be read but not written if the number Current Sector exceeds a reserved region.
3. The real location is Current Sector+begin location of partition if Current Sector is at the FAT or root of a partition 4. The read operation is done by a DOREAD algorithm described below and the write operation is done by a DOWRITE algorithm described below if above conditions are not met.
5. If the hard disk is full, the write operation will lead to a flag region showing error messages.

DOREAD Algorithm

Provided that the current sector is logsector, the corresponding flag region can be determined by logsector and the real location can accordingly be determined. The real location equal to logsector if the flag region is occupied by manager, other flag or is not used. If the flag region point to a new flag region, the real location is determined by the new flag region.

DOWRITE Algorithm

Provided that the current sector is logsector, the corresponding flag region can be determined by logsector and the real location can also be determined.

(1) If the flag region is occupied by manager or other flag, then a new and empty flag region should be found; an error message is generated if no empty region can be found; the following steps are executed after new locations are found (a) changing the current flag such that the current flag points to a new flag responsible for really accessing operation.

(b) Changing the status of current flag such that the location is dented information of occupation.

(c) Calculating the real location by the new flag.

(2) If the flag region shows the information of being free to use, then real location=logsector (3) If the flag region shows the information of being used by current flag, then real location=logsector (4) If the current flag is referred to a new flag, then the real location is calculated by the new flag To sum up, the inventive method scan the hard disk and record the scanning information in a flag region. Moreover, the BIOS INT 13 is replaced by a new INT 13 (MYINT 13) which can find the real and accessible hard disk location with reference to the flag region and the privilege of user and invoke the BIOS INT 13 to execute the read/write operation. By this method, the over-writing of data can be prevented.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A restoring method for hard disk, comprising following steps:

scanning the partition and file allocation table (FAT) of hard disk and recording above information in a plurality of flag regions on end portion of hard disk wherein each flag region contains flag for indicating the accessibility of said sector in hard disk and pointer associated to other flag;

replacing the INT 13 of BIOS with a modified MYINT 13 to handle the reading and writing operation of data; wherein the modified MYINT 13 can find a writable location by referring to the information stored in the flag region and the privilege of user and invoke the original INT 13 to execute the reading and writing operation virtually;

by above steps, the writing operation to a location containing data can be prevented, and the data accessed by other user in a multi-user mode can also be prevented.

2. The method as in claim 1, wherein each said flag region contains 32 bit with higher 8 bit indicating the status of corresponding sector and lower 24 bit as pointer pointing to other flag region.

3. The method as in claim 1, wherein said flag region contains following possibilities:

a. used by manager;

b. used by other flag;

c. used by the present flag;

d. free to use;

e. pointing to other flag.

\* \* \* \* \*